United States Patent
Akay et al.

(10) Patent No.: US 10,598,149 B2
(45) Date of Patent: Mar. 24, 2020

(54) WIND TURBINE ROTOR BLADE WITH VORTEX GENERATORS

(71) Applicant: Siemens Gamesa Renewable Energy A/S, Brande (DK)

(72) Inventors: Busra Akay, Herning (DK); Peder Bay Enevoldsen, Vejle (DK)

(73) Assignee: SIEMENS GAMESA RENEWABLE ENERGY A/S (DK)

( * ) Notice: Subject to any disclaimer, the term of this patent is extended or adjusted under 35 U.S.C. 154(b) by 183 days.

(21) Appl. No.: 15/638,871

(22) Filed: Jun. 30, 2017

(65) Prior Publication Data
US 2018/0010579 A1 Jan. 11, 2018

(30) Foreign Application Priority Data

Jul. 5, 2016 (EP) ..................................... 16178023

(51) Int. Cl.
*F03D 7/02* (2006.01)
*F03D 1/06* (2006.01)
*F03D 9/25* (2016.01)

(52) U.S. Cl.
CPC .......... *F03D 7/0236* (2013.01); *F03D 1/0633* (2013.01); *F03D 1/0675* (2013.01);
(Continued)

(58) Field of Classification Search
CPC .... F03D 7/0236; F03D 1/0633; F03D 1/0675; F03D 7/022; F03D 9/25; F05B 2240/122;
(Continued)

(56) References Cited

U.S. PATENT DOCUMENTS 8,182,231 B2 * 5/2012 Corten .................. F03D 1/0641
416/223 R
8,192,161 B2 * 6/2012 Baker ................... F03D 1/0641
416/23
(Continued)

FOREIGN PATENT DOCUMENTS

CN 101213131 A 7/2008
CN 102165185 A 8/2011
(Continued)

OTHER PUBLICATIONS

European Search Report for Application No. 16178023.4, dated Aug. 2, 2018.
(Continued)

*Primary Examiner* — Kenneth J Hansen
*Assistant Examiner* — Eric J Zamora Alvarez
(74) *Attorney, Agent, or Firm* — Schmeiser, Olsen & Watts LLP

(57) ABSTRACT

A rotor blade of a wind turbine including at least one vortex generator is provided. The vortex generator is attached to the surface of the rotor blade and is located at least partially within the boundary layer of the airflow flowing across the rotor blade. The vortex generator is exposed to a stagnation pressure, which is caused by the fraction of the airflow passing over the vortex generator and of which the magnitude depends on the velocity of the fraction of the airflow passing over the vortex generator. The vortex generator is arranged and prepared to change its configuration depending on the magnitude of the stagnation pressure acting on the vortex generator. Furthermore, an aspect relates to a wind turbine for generating electricity with at least one such rotor blade.

14 Claims, 5 Drawing Sheets

(52) U.S. Cl.
CPC ............... *F03D 7/022* (2013.01); *F03D 9/25* (2016.05); *F05B 2240/122* (2013.01); *F05B 2240/31* (2013.01); *Y02E 10/721* (2013.01); *Y02E 10/723* (2013.01)

(58) Field of Classification Search
CPC .. F05B 2240/31; Y02E 10/721; Y02E 10/723; B64D 2033/0226; F15D 1/0065
See application file for complete search history.

(56) References Cited

U.S. PATENT DOCUMENTS

| | | | | |
|---|---|---|---|---|
| 8,256,720 | B2* | 9/2012 | Ikeda | ............... B64C 23/06 244/199.3 |
| 8,794,919 | B2* | 8/2014 | Baek | ............... F03D 1/0641 416/1 |
| 9,789,956 | B2* | 10/2017 | Bordoley | ............... B64C 13/02 |
| 2007/0018056 | A1 | 1/2007 | Narramore | |
| 2009/0068018 | A1 | 3/2009 | Corten | |
| 2011/0142595 | A1* | 6/2011 | Santiago | ............... F03D 1/0675 415/4.3 |
| 2011/0142664 | A1 | 6/2011 | Anjuri et al. | |
| 2011/0217167 | A1 | 9/2011 | Hancock et al. | |
| 2015/0292476 | A1 | 10/2015 | Obrecht et al. | |
| 2016/0083083 | A1 | 3/2016 | Bordoley et al. | |

FOREIGN PATENT DOCUMENTS

| | | |
|---|---|---|
| CN | 104728038 A | 6/2015 |
| CN | 104976075 A | 10/2015 |
| CN | 105438450 A | 3/2016 |
| EP | 2402595 A2 | 1/2012 |
| EP | 2405129 A1 | 1/2012 |
| WO | 2016054080 A1 | 4/2016 |

OTHER PUBLICATIONS

Extended European Search Report for EP Application No. 16178023.4, dated Jan. 17, 2017.
Chinese Exam Report for Application No. 201710543275.3, dated Nov. 5, 2018.

* cited by examiner

WIND TURBINE ROTOR BLADE WITH VORTEX GENERATORS

CROSS-REFERENCE TO RELATED APPLICATIONS

This application claims priority to European application No. EP 16178023 having a filing date of Jul. 5, 2016, the entire contents of which are hereby incorporated by reference.

FIELD OF TECHNOLOGY

The following relates to a rotor blade of a wind turbine comprising at least one vortex generator. Furthermore, embodiments of the invention relates to a wind turbine for generating electricity comprising at least one such rotor blade.

BACKGROUND

Vortex generators are well known devices for manipulating the airflow flowing across the surface of a rotor blade of a wind turbine. The function of a vortex generator is to generate vortices downstream of the area where the vortex generator is mounted to the surface of the rotor blade. The generated vortices may re-energize the boundary layer close to the surface of the rotor blade. This re-energization of the boundary layer may delay or prevent stall. The delay or elimination of stall at the section of the rotor blade where the vortex generators are mounted generally increases the lift coefficient of the rotor blade at this section. The increase of the lift is generally desirable. An increase of the lift generally correlates with an increase of the load of the rotor blade. This increase of the load of the rotor blade may be undesirable.

Therefore, there exists the desire to provide a concept how to selectively activate or deactivate, respectively, a vortex generator for a rotor blade of a wind turbine.

SUMMARY

According to embodiments of the invention there is provided a rotor blade of a wind turbine comprising at least one vortex generator, wherein the vortex generator is attached to the surface of the rotor blade. The vortex generator is located at least partially within the boundary layer of the airflow flowing across the rotor blade. The vortex generator is exposed to a stagnation pressure, which is caused by the fraction of the airflow passing over the vortex generator and of which the magnitude depends on the velocity of the fraction of the airflow passing over the vortex generator. Furthermore, the vortex generator is arranged and prepared to change its configuration depending on the magnitude of the stagnation pressure acting on the vortex generator, such that, with increasing stagnation pressure in the boundary layer, the ability of the vortex generator to generate vortices decreases.

The boundary layer is the layer of the airflow in the immediate vicinity of the surface of the rotor blade. The boundary layer is also referred to as "surface boundary layer".

In the boundary layer the effects of viscosity are significant. The thickness of the boundary layer is defined as the distance of the surface of the rotor blade at which the velocity of the airflow is 99% of the free stream velocity. For the surface of the rotor blade, the confining, i.e. limiting surface of the rotor blade is taken, which is typically referred to as the suction side and the pressure side of the rotor blade, respectively.

The airflow flowing across the rotor blade is understood to be the typical airflow flowing from the leading edge section to the trailing edge section of the rotor blade. Depending on the particular set up and operation mode of the wind turbine, and depending on the concrete direction of the impinging airflow, the direction of the airflow may vary. However, in general, the airflow flowing across the rotor blade is substantially parallel to the chordwise direction of the rotor blade.

The expression "the airflow passes over the vortex generator" can in other words be described as "the airflow impinges on the vortex generator".

The stagnation pressure, which is sometimes also referred to as the Pitot pressure, is defined as the pressure built up in a fluid which is brought to rest isentropically. For a low velocity flow which can be assumed to be incompressible, the stagnation pressure is equal to the sum of a static pressure and a dynamic pressure. The static pressure is to be understood as being the free stream hydrostatic pressure, which for example for an open flow application such as a wind turbine is equivalent with the ambient pressure. The term dynamic pressure refers to the kinetic energy of a fluid per unit mass, and is therefore dependent on the velocity of the airflow. If a fluid is brought to rest isentropically, all the kinetic energy per unit mass of the fluid is converted into pressure, and therefore the pressure at a stagnation point (a point where the fluid is at rest) equals the sum of the static and the dynamic pressure. The stagnation pressure can be measured using a so-called Pitot tube.

A key aspect of embodiments of the present invention is that the varying magnitude of the stagnation pressure is used in order to activate or deactivate selectively the vortex generator of the turbine blade. As the static pressure is assumed to be substantially equal during the relevant operation conditions of the wind turbine, it is actually the variation of the dynamic pressure which causes the activation or deactivation of the vortex generator.

The dynamic pressure may increase or decrease due to the increase or decrease of the thickness of the boundary layer. A thin boundary layer, for example, leads to a high dynamic pressure, while a thick boundary layer involves a small dynamic pressure. Therefore, in other words, the inventive concepts can be described as well by a selective activation or deactivation of the vortex generator depending on the thickness of the boundary layer.

Advantageously, the activation or deactivation of the vortex generator occurs passively. Thus, an actively driven actuator is not necessary in order to activate the vortex generator. Instead, by the pure increase of the stagnation pressure, a change in the configuration of the vortex generator is caused.

For this purpose, in a particular embodiment of the invention, the rotor blade comprises a pressure tube extending substantially upstream from the vortex generator for guiding a fraction of the airflow flowing across the rotor blade to an inflatable element.

Depending on the thickness of the boundary layer, a high velocity airstream or a low velocity airstream flows through the pressure tube and impinges, i.e. hits or enters, the inflatable element. If the dynamic pressure, and consequently also the stagnation pressure, is small, the inflatable element is not inflated or only little inflated. In contrast, for high dynamic and stagnation pressures, a high velocity airflow is flowing through the pressure tube, leading to the inflatable element to be inflated to a significant extent.

In an alternative embodiment, the varying stagnation pressure is only used as a trigger for triggering an actuator for activating the vortex generator. This actuator may e.g. be electrically or hydraulically driven. As an example, the actuator may inflate or deflate the inflatable element being associated with the vortex generator.

Note that the ability of the vortex generator to generate vortices decreases with increasing stagnation pressure in the boundary layer.

In other words, the rotor blade is designed such that a thin boundary layer leads to a high stagnation pressure and to a deactivation of the vortex generator, while a thick boundary layer leads to a small stagnation pressure, resulting in an activation of the vortex generator.

It is known to place vortex generators almost at any spanwise position of the rotor blade. Therefore, the skilled person has to make a choice where to beneficially place the inventive vortex generator on the rotor blade. It is suggested to place and situate the vortex generator in the outboard half, in particular in the outboard third, of the rotor blade.

This choice is preferred because here the impact on the lift coefficient, and hence, on the load of the rotor blade is particularly strong. With the notion "outboard", the area adjacent to the tip of the rotor blade is meant.

Examples of an inflatable element which is suitable to be used in the context of embodiments of this invention, a hose or a pressure chamber are to be mentioned.

A hose has the advantage that it can be designed separately from the rest of the rotor blade and may also be exchanged easily after a certain time of operation.

On the other hand, a pressure chamber, which has to be understood as a cavity running substantially in spanwise direction, is fully integrated in the profile of the rotor blade. No additional components and parts are used, which is advantageous. However, it is difficult to retrofit, for example, a rotor blade by a pressure chamber.

In another embodiment of the invention, the vortex generator is at least partially embedded into the surface of the rotor blade.

In this case, a vortex generator is seen as being active or activated when the vortex generator is sticking out from the surface. In other words, it is projecting away from the surface of the rotor blade. In contrast to this scenario, a vortex generator is seen as deactivated leading to a decrease in lift and load, if the vortex generator is entirely or at least partially embedded into the surface of the rotor blade.

Note that the notion "into the surface of the rotor blade" signifies the presence of a recess or a groove or similar design options. As the remaining surface portions of the general surface of the rotor blade is unchanged, a vortex generator is called to be "embedded into the surface" if it somehow intersects the expected contour of the rotor blade.

A possibility to selectively embed the vortex generator is that in this case not only the ability to generate vortices is prevented or reduced but also the drag of the rotor blade. This is desirable because a reduced drag normally leads to an increase of the performance of the rotor blade and, hence, of the wind turbine. As mentioned above, it is preferred that the portion of the vortex generator which is embedded into the surface of the rotor blade increases with increasing stagnation pressure. This ultimately leads to a selective deactivation of the vortex generator with increasing stagnation pressure.

In another embodiment of the invention, the vortex generator is able to bend depending on the value of the stagnation pressure acting on the vortex generator.

In this embodiment, an inflatable element is not necessarily needed. Instead, by the mere presence and design of the vortex generator the configuration, in particular the shape of the vortex generator can be varied. This may be realized by an elastic portion at the vortex generator.

Again, in a preferred configuration, at high velocities of the airflow, the vortex generator is bent down towards the surface of the rotor blade and is consequently at least partially deactivated. This has the consequence that the ability to generate vortices is reduced.

If, on the other hand, the boundary layer thickness is large, thus, the stagnation pressure is small, the vortex generator moves away from the surface. Thus, a greater portion of the vortex generator is sticking out. In other words, the vortex generator projects away from the surface such that the ability of the vortex generator to generate vortices is increased.

A similar, but slightly different, design is a vortex generator which is able to straighten relative to a direction of the airflow depending on the value of the stagnation pressure acting on the vortex generator.

In this case, it is preferred that a pair of vortex generators exists at least at the surface of the rotor blade. Then, for example, at low velocity of the airflow (thick boundary layer), a large angle is present between the two vortex generators of the pair, while at high velocity of the airflow (thin boundary layer), the angle between the two vortex generators of the pair is small, even leading to a substantially parallel configuration of the two vortex generators of the pair.

In practice, this can also be realized by an elastic portion of the vortex generator.

Finally, embodiments of the present invention also relate to a wind turbine for generating electricity comprising at least one rotor blade according to one of the embodiments described above.

BRIEF DESCRIPTION

Some of the embodiments will be described in detail, with reference to the following figures, wherein like designations denote like members, wherein.

Note that the following drawings are only schematically. Similar or identical reference signs are used throughout the drawings.

DETAILED DESCRIPTION

Figure 1:
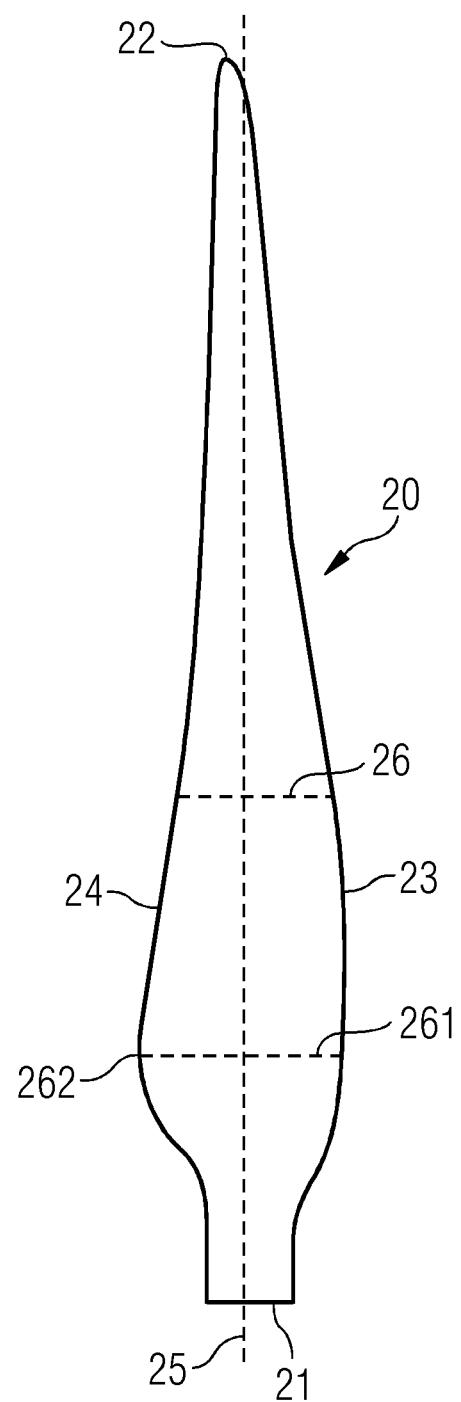
FIG. 1 shows a rotor blade of a wind turbine.

FIG. 1 shows a rotor blade 20 of a wind turbine. The rotor blade 20 comprises a root 21 and a tip 22. The root 21 and the tip 22 are connected by a virtual line, which is referred to as the span 25. The span 25 can be described as a virtual line, which is a straight line and which not necessarily exactly connects the root 21 and the tip 22. This would be the case if the rotor blade was a straight rotor blade. If, however, as for example illustrated in the example of the rotor blade of FIG. 1, the rotor blade is a slightly swept rotor blade, the tip may be slightly separate from the span 25. If the rotor blade is designed for a pitchable wind turbine, the span 25 can be associated and coincides with the pitch axis of the rotor blade.

Another characteristic feature and parameter of rotor blades of a wind turbine are the chords of the rotor blade. The chords 26, which are also referred to as the chord lines, can be defined and assigned for every spanwise position from the root to the tip of the rotor blade. The chord 26 is defined as the straight line being perpendicular to the span 25 and connecting the leading edge 23 of the rotor blade 20 with the trailing edge 24 of the rotor blade 20.

A particular chord length can be assigned to each chord 26. The maximum chord 261 is understood to be that chord which has the maximum length. The portion of the rotor blade where the maximum chord 261 is present is referred to as the shoulder 262 of the rotor blade. The part of the rotor blade between the shoulder 262 and the tip 22 is also referred to as the airfoil portion of the rotor blade. On the other hand, the part of the rotor blade between the shoulder 262 and the root 21 is referred to a transition and root region of the rotor blade.

Figure 2:
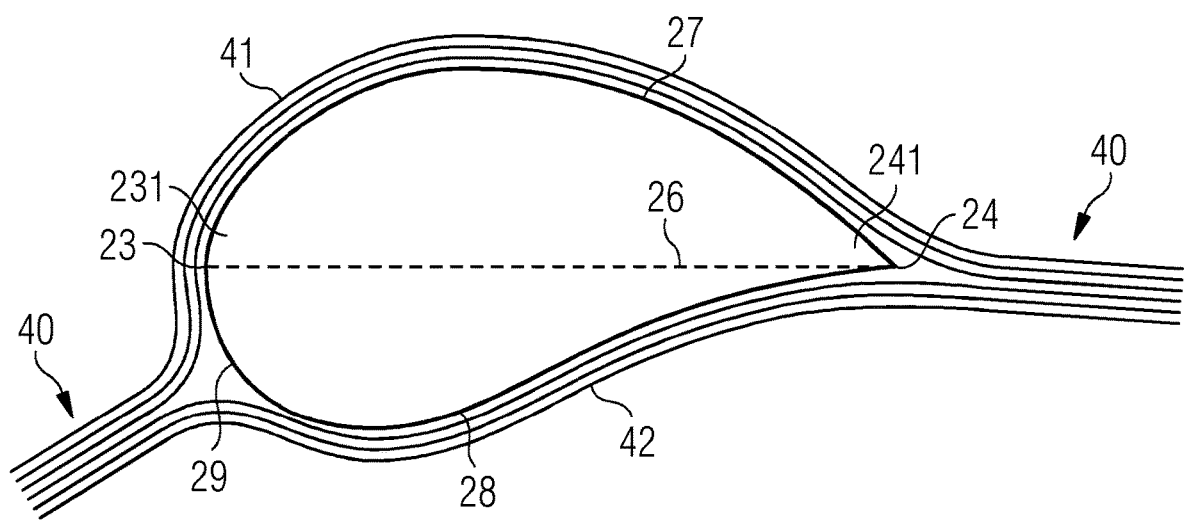
FIG. 2 shows a cross sectional view of the rotor blade at a certain spanwise position.

FIG. 2 shows a cross sectional view at a certain spanwise position of the airfoil portion of the rotor blade. Again, the leading edge 23 and the trailing edge 24 can be seen. Additionally, the trailing edge section 241 and the leading edge section 231 are referenced in FIG. 2. The leading edge section 231 is defined as that section surrounding the leading edge 23 reaching from the leading edge 23 to a chordwise position of ten percent of the chord length as measured from the leading edge 23. Likewise, the trailing edge section 241 of the rotor blade is defined as that section of the rotor blade which extends between ninety percent chordwise position as measured from the leading edge 23 until the very trailing edge 24.

FIG. 2 also illustrate the airflow 40 flowing from the leading edge section 231 to the trailing edge section 241 of the rotor blade. As can be seen, the airflow 40 is subdivided into a suction side airflow 41 and a pressure side airflow 42. The separation of the airflow occurs at the stagnation point 29. Typically, the stagnation point 29 is located at the pressure side 28 of the rotor blade, but may also be located at the suction side 27 of the rotor blade. The exact position of the stagnation point 29 depends on a variety of factors, mainly it depends on the angle of attack and the pitch movement of the rotor blade.

Figure 3:
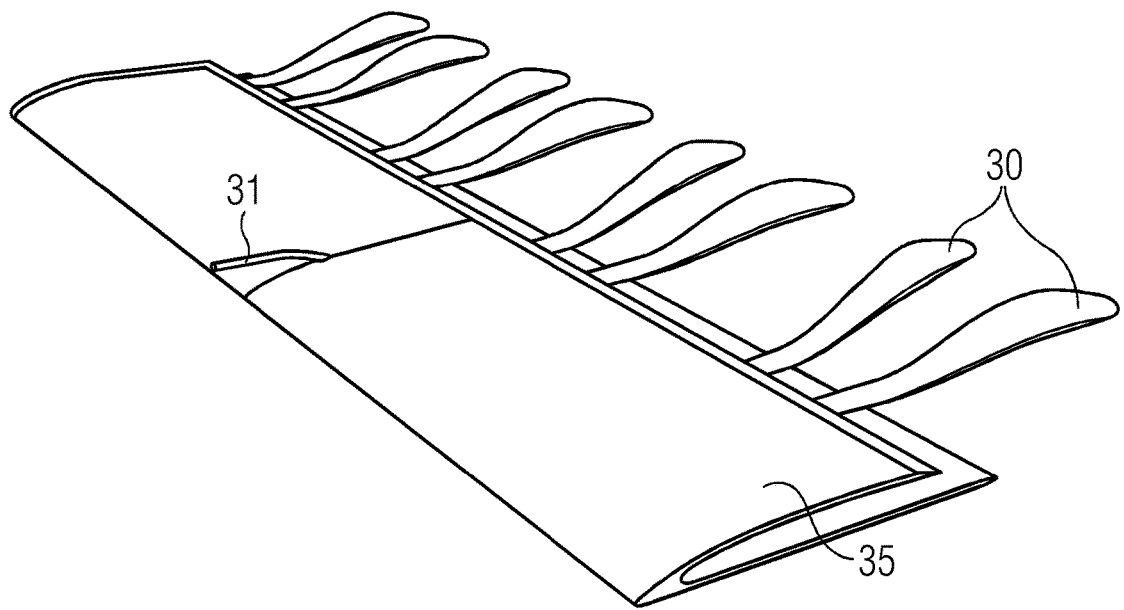
FIG. 3 shows a perspective view of a first embodiment of vortex generators.
Figure 4:
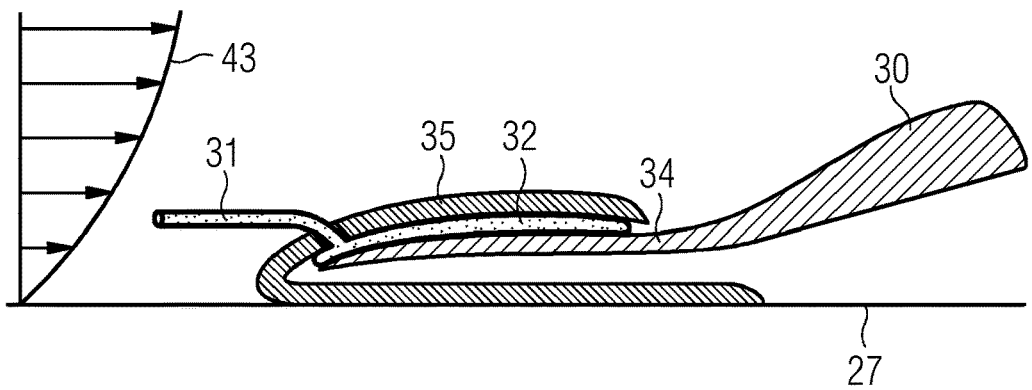
FIG. 4 shows a cut-away view of a first embodiment of a thick embodiment of a vortex generators.
Figure 5:
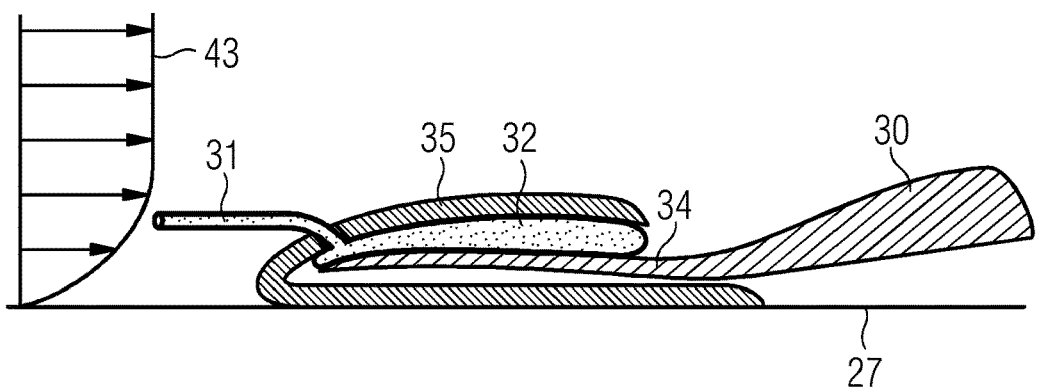
FIG. 5 shows a cut-away view of a first embodiment of a thin embodiment of a vortex generators.

FIG. 3-5 show a first embodiment of the present invention. In particular, a first embodiment of a vortex generator 30 is disclosed, which can be used and which is a part of a first embodiment of an inventive rotor blade.

FIG. 3 shows a perspective view of four pairs of such vortex generators 30. These vortex generators 30 are attached to a housing 35, which, as a whole, can be attached and mounted onto the surface, e.g. the suction side surface, of the rotor blade. An important feature of the arrangement as illustrated in FIG. 3 is the pressure tube 31. The pressure tube 31 consists of a relatively small diameter tube which is arranged upstream of the vortex generator. The arrangement furthermore comprises an inflatable member, namely a hose 32. This hose 32 is located within the housing 35. The hose 32 is able to push the vortex generator 30 downwards towards the surface of the rotor blade which is exemplarily referenced by the suction side 27. In order to facilitate or enable such a bending of the vortex generator, the vortex generator 30 comprises an elastic portion 34.

FIG. 4 illustrates the scenario of a thick boundary layer—confer to the shown velocity profile 43 in FIG. 4. In contrast to FIG. 4, FIG. 5 illustrates the scenario of a thin boundary layer—confer to the velocity profile 43 as illustrated in FIG. 5. As it can be seen, depending on the thickness of the boundary layer, the hose 32 is inflated or not which leads to an upwardly projecting vortex generator 30 or a vortex generator which is almost in contact with the suction side 27 of the rotor blade.

Note that in the first embodiment of the invention, the housing 35 is designed as a relatively stiff and rigid element. This means that its shape is substantially independent on the state of the hose 32. Whether the hose 32 is inflated (as in FIG. 5) or not (as in FIG. 4)—the housing has the same cross-sectional profile. As a consequence, the airflow, which is passing over the housing 35 is not influenced by the fact whether the hose 32 is inflated or deflated.

Figure 6:
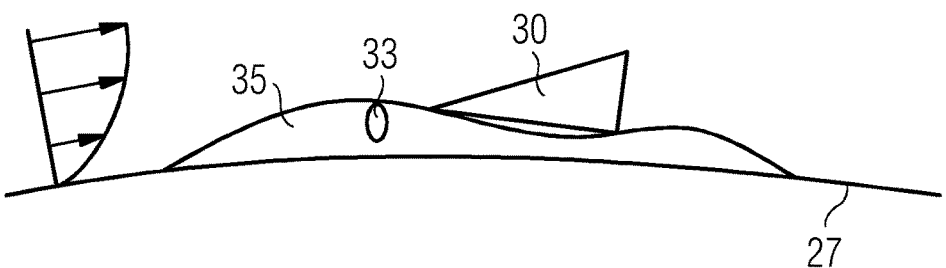
FIG. 6 shows a side view of a second embodiment of vortex generators having a deflated pressure chamber.
Figure 7:
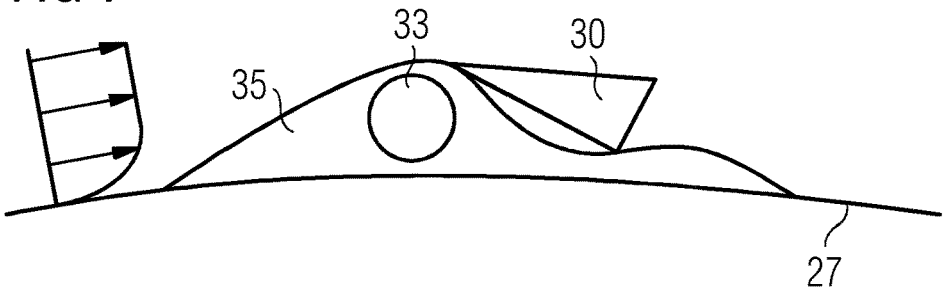
FIG. 7 shows a side view of a second embodiment of vortex generators having an inflated pressure chamber.

FIGS. 6 and 7 shows a second embodiment of the invention. Here, inflatable element is exemplarily designed as a pressure chamber 33. The pressure chamber may be in a deflated state (confer FIG. 6)—which is the case for a thick boundary layer, i.e. for a low stagnation pressure—or it may be in an inflated state (confer FIG. 7)—which is the case for a thin boundary layer, i.e. for a high stagnation pressure.

The pressure chamber 33 is accommodated and surrounded by a housing 35. In this embodiment, the housing is made of a flexible material. As a consequence, and contrary to the first embodiment as illustrated in FIGS. 3 to 5, the housing does change its shape depending of the state of the inflatable element.

Descriptively speaking, the housing 35 represents a "bump" for the airflow passing over it. Note that the airflow, which is passing over the housing 33, is influenced by the fact whether the pressure chamber 33 is inflated or deflated.

Figure 8:
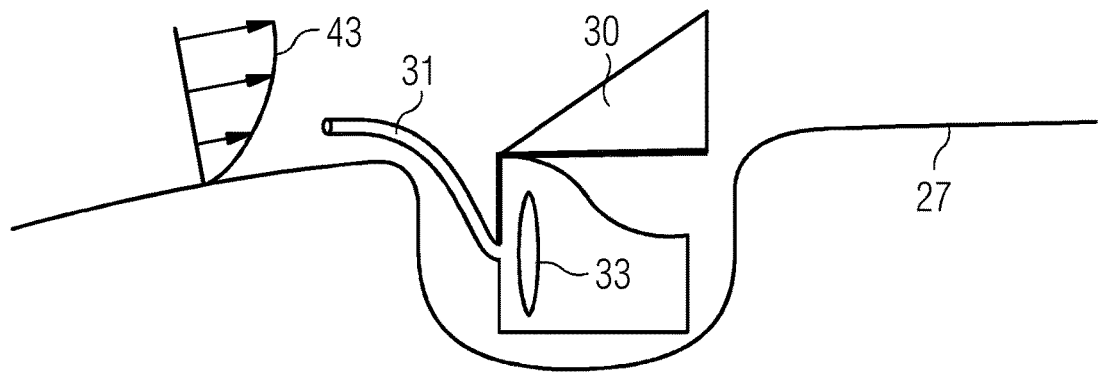
FIG. 8 shows a third embodiment of vortex generators with a slightly inflated pressure chamber.
Figure 9:
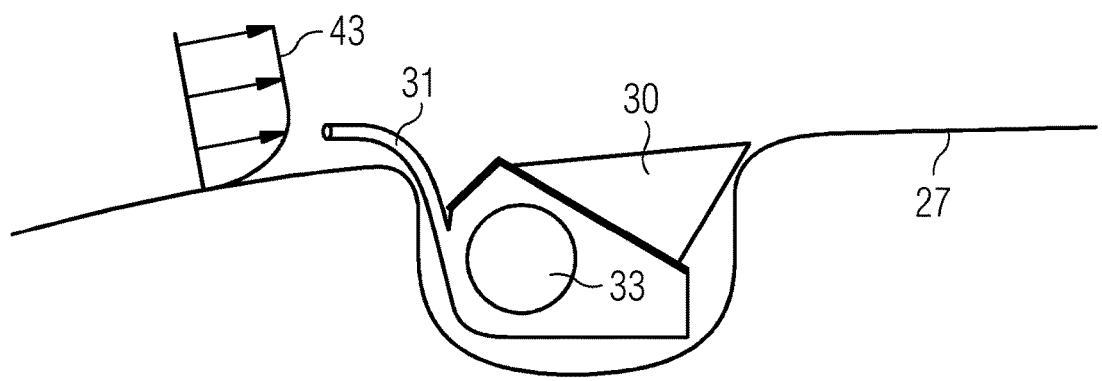
FIG. 9 shows a third embodiment of vortex generators with an inflated pressure chamber.

FIGS. 8 and 9 disclose a third embodiment of a vortex generator. This time, the vortex generator 30 is partially embedded into the surface, e.g. into the suction side 27 of the rotor blade. In other words, the rotor blade is provided with a recess or groove at its suctions side 27. In this groove, a device or arrangement comprising a pressure chamber 33 can be seen. This pressure chamber is connected with a pressure tube 31. Depending on the stagnation pressure which is guided through the pressure tube 31, the pressure chamber 33 is either inflated (confer FIG. 9) or it is not or only slightly inflated (confer FIG. 8). As a consequence, the vortex generator 30 is either submerged and embedded into the surface of the rotor blade (confer FIG. 9) or it projects away and sticks out of the surface (confer FIG. 8).

This third embodiment has the advantage that additional drag from the attachment portion as shown in the first embodiment as illustrated in FIGS. 3-5, is avoided. Thus, additional drag from the attachment portion, but also from the vortex generator as such, is reduced.

Figure 10:
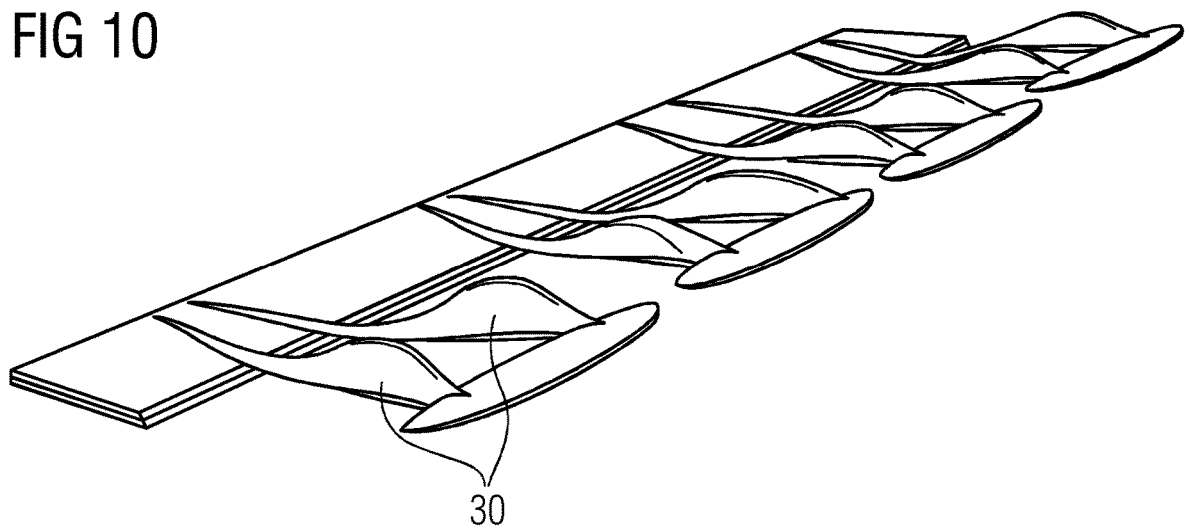
FIG. 10 shows a fourth embodiment of vortex generators.
Figure 11:
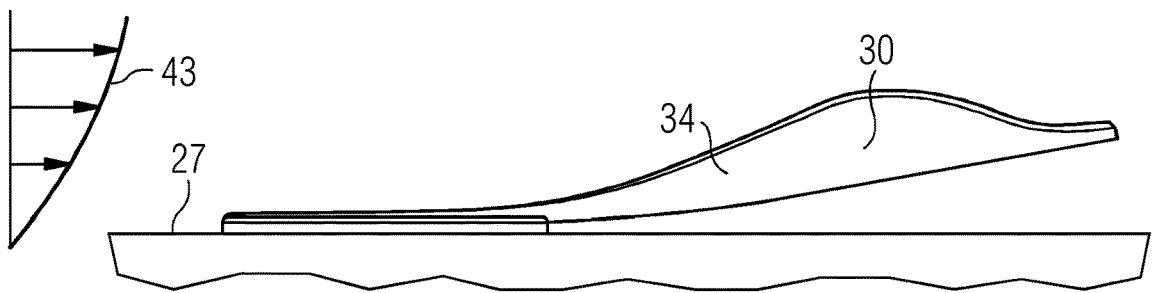
FIG. 11 shows a fourth embodiment of vortex generators with a thick boundary layer.
Figure 12:
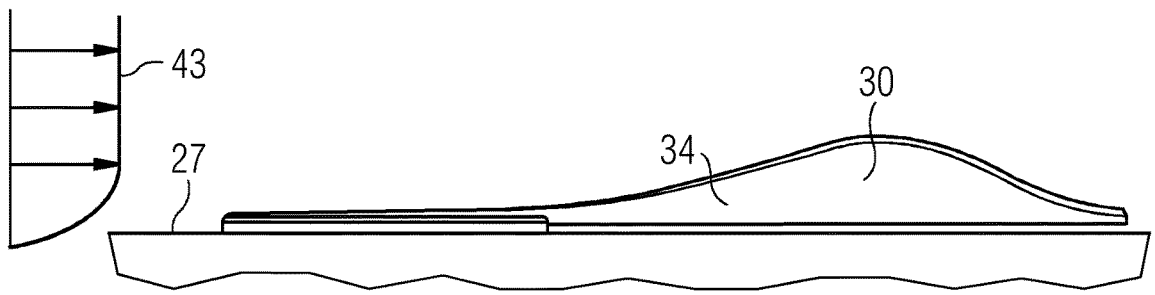
FIG. 12 shows a fourth embodiment of vortex generators with a thin boundary layer.

FIGS. 10, 11 and 12 disclose a fourth embodiment of an inventive vortex generator. This time no inflatable element, such as a pressure chamber or a hose, is used. Instead, it is the direct and sole design and configuration of the vortex generator 30 which leads to a changing configuration of the vortex generator in dependence of the velocity profile 43. See FIG. 11 for these scenarios of a thick boundary layer. As a consequence, the stagnation pressure at the position of the vortex generator 30 is small, thus the vortex generator which comprises an elastic portion 34 and which is bent upwards, i.e. away from the surface of the rotor blade, is projecting away and is able to generate vortices to a considerable extent. In contrast to that, FIG. 12 shows these scenarios of a thin boundary layer which can be seen by the velocity profile 43 leading to the bending down of the vortex generator 30 towards the suction side surface of the rotor blade. In the configuration as illustrated in FIG. 12 the ability of generating vortices by the vortex generator is heavily reduced.

Figure 13:
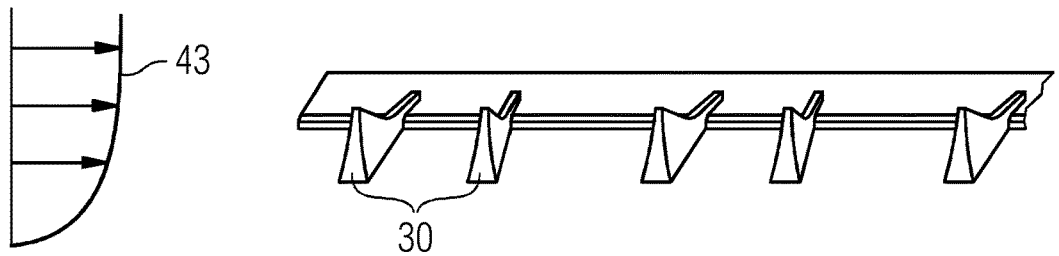
FIG. 13 shows a fifth embodiment of vortex generators.
Figure 14:
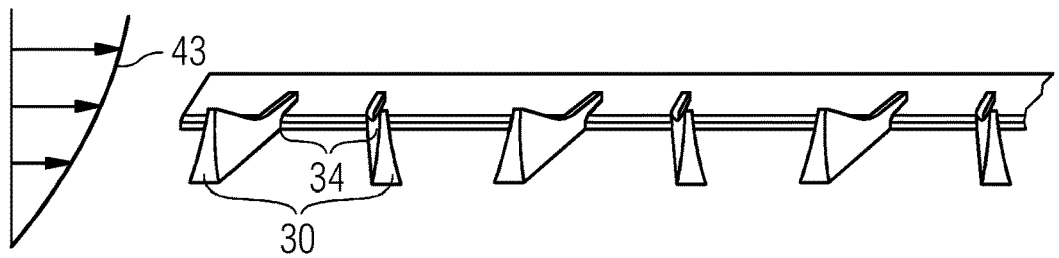
FIG. 14 shows a fifth embodiment of vortex generators wherein adjacent vortex generators comprise a significant angle relative to each other.

Finally, the FIGS. 13 and 14 disclose a fifth embodiment of the invention. Similar to the fourth embodiment, no inflatable element or the like is present. Instead, the vortex generators themselves again comprise an elastic portion 34. This elastic portion 34 is designed such that for a thin boundary layer, as illustrated in FIG. 13, the vortex generators 30 are almost parallel to each other. They can also be described as being straightened by the high stagnation pressure of the airflow impinging on the vortex generator. In contrast to FIG. 13, FIG. 14 shows this scenario of a thick boundary layer, wherein the relatively small stagnation pressure is not able to overcome the pre-bent of the elastic portion 34 of the vortex generators 30. Thus, the adjacent vortex generators comprise a significant angle relative to each other. In this case, the ability to generate vortices is increased, compared to the straightened scenario as illustrated in FIG. 13.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A rotor blade of a wind turbine comprising at least one vortex generator, wherein the at least one vortex generator is attached to a surface of the rotor blade, the at least one vortex generator is located at least partially within a boundary layer of an airflow flowing across the rotor blade, the at least one vortex generator is exposed to a stagnation pressure, which is caused by a fraction of the airflow passing over the at least one vortex generator and of which a magnitude depends on a velocity of the fraction of the airflow passing over the at least one vortex generator, wherein a configuration of the at least one vortex generator changes depending on the magnitude of the stagnation pressure acting on the at least one vortex generator and not depending upon an actively driven actuator,
wherein when the magnitude of the stagnation pressure acting on the vortex generator increases, the stagnation pressure changes the configuration of the vortex generator to decrease generation of vortices, and
wherein when the magnitude of the stagnation pressure on the vortex generator decreases, the stagnation pressure changes the configuration of the vortex generator to increase generation of vortices.

2. The rotor blade according to claim 1, wherein the at least one vortex generator is situated in an outboard half of the rotor blade.

3. The rotor blade according to claim 1, wherein the at least one vortex generator comprises an inflatable element, selected from a hose or a pressure chamber.

4. The rotor blade according to claim 3, wherein the rotor blade comprises a pressure tube extending upstream from the at least one vortex generator for guiding a portion of the fraction of the airflow flowing across the rotor blade to the inflatable element.

5. The rotor blade according to claim 3, wherein the at least one vortex generator is at least partially embedded into the surface of the rotor blade.

6. The rotor blade according to claim 1, wherein the at least one vortex generator is able to bend depending on a value of the stagnation pressure acting on the at least one vortex generator.

7. The rotor blade according to claim 6, wherein an elastic portion of the at least one vortex generator enables the at least one vortex generator to bend or straighten.

8. A wind turbine for generating electricity with at least one rotor blade according to claim 1.

9. The rotor blade according to claim 1, wherein the at least one vortex generator is situated in an outboard third of the rotor blade.

10. A vortex generator,
wherein the vortex generator is attached to a surface of a rotor blade,
wherein the vortex generator is located on the surface of the rotor blade such that the vortex generator is located at least partially within a boundary layer of an airflow flowing across the rotor blade,
wherein the vortex generator is configured to be acted upon by a stagnation pressure caused by a fraction of the airflow passing over the vortex generator, the stagnation pressure having a magnitude dependent on a velocity of the fraction of the airflow passing over the vortex generator,
wherein the stagnation pressure acting upon the vortex generator directly changes a configuration of the vortex generator without an actively driven actuator,
wherein when the magnitude of the stagnation pressure on the vortex generator increases, the stagnation pressure changes the configuration of the vortex generator to decrease generation of vortices, and
wherein when the magnitude of the stagnation pressure on the vortex generator decreases, the stagnation pressure changes the configuration of the vortex generator to increase generation of vortices.

11. The vortex generator according to claim 10,
wherein the stagnation pressure acting upon the vortex generator and directly changing the configuration of the vortex generator passively activates and deactivates the vortex generator in response to variations in the stagnation pressure.

12. The vortex generator according to claim 10,
wherein the vortex generator comprises an inflatable element, wherein the inflatable element receives a portion of the fraction of the airflow flowing across the rotor blade through a pressure tube extending upstream from the vortex generator.

13. A rotor blade of a wind turbine comprising:
a vortex generator,
  wherein the vortex generator is attached to a surface of the rotor blade,
  wherein the vortex generator is located on the surface of the rotor blade such that the vortex generator is located at least partially within a boundary layer of an airflow flowing across the rotor blade,
  wherein the vortex generator comprises an inflatable element,
  wherein the vortex generator is configured to be acted upon by a stagnation pressure caused by a fraction of the airflow passing over the vortex generator, the stagnation pressure having a magnitude dependent on a velocity of the fraction of the airflow passing over the vortex generator, and
  wherein a configuration of the vortex generator is configured to change depending on the magnitude of the stagnation pressure acting upon the vortex generator, such that, with increasing stagnation pressure in the boundary layer, the configuration of the vortex generator changes to decrease generation of vortices, and with decreasing stagnation pressure in the boundary layer, the configuration of the vortex generator changes to increase generation of vortices, and
a pressure tube extending upstream from the vortex generator for guiding a portion of the fraction of the airflow flowing across the rotor blade to the inflatable element.

14. The rotor blade of a wind turbine according to claim 13, wherein the configuration of the vortex generator changes configuration without an actively driven actuator.

* * * * *